US011835335B2

(12) United States Patent
Juslin

(10) Patent No.: US 11,835,335 B2
(45) Date of Patent: Dec. 5, 2023

(54) MEASUREMENT SYSTEM WITH HEAT MEASUREMENT

(71) Applicant: Oy Mapvision Ltd, Helsinki (FI)

(72) Inventor: Janne Juslin, Lappila (FI)

(73) Assignee: Oy Mapvision Ltd, Helsinki (FI)

( * ) Notice: Subject to any disclaimer, the term of this patent is extended or adjusted under 35 U.S.C. 154(b) by 341 days.

(21) Appl. No.: 16/649,516

(22) PCT Filed: Oct. 5, 2018

(86) PCT No.: PCT/EP2018/077068
§ 371 (c)(1),
(2) Date: Mar. 20, 2020

(87) PCT Pub. No.: WO2019/068840
PCT Pub. Date: Apr. 11, 2019

(65) Prior Publication Data
US 2020/0318958 A1    Oct. 8, 2020

(30) Foreign Application Priority Data
Oct. 6, 2017  (FI) ..................... 20175879

(51) Int. Cl.
*G01B 21/04*    (2006.01)
*G01B 11/245*    (2006.01)
(Continued)

(52) U.S. Cl.
CPC ......... *G01B 21/045* (2013.01); *G01B 5/0014* (2013.01); *G01B 11/245* (2013.01); *G01N 21/01* (2013.01)

(58) Field of Classification Search
CPC .. G01B 21/045; G01B 5/0014; G01B 11/245; G01B 11/022; G01B 11/028; G01N 21/01; G01J 5/08; G01J 5/0896; G06T 7/0004
(Continued)

(56) References Cited

U.S. PATENT DOCUMENTS 4,481,534 A    11/1984    Saito
6,180,939 B1    1/2001    Markey, Jr. et al.
(Continued)

FOREIGN PATENT DOCUMENTS

CN    101275828 A    10/2008
CN    102089873 A    6/2011
(Continued)

OTHER PUBLICATIONS

Chinese Office Action for Chinese Patent Application No. 201880065039.8 dated May 8, 2021, 16 pages (English translation).
(Continued)

*Primary Examiner* — Isiaka O Akanbi
(74) *Attorney, Agent, or Firm* — Merchant & Gould P.C.

(57) ABSTRACT

A measurement system using heat compensation profiles for compensating inaccuracies caused by heat distortion is disclosed. Measurement of objects with different heat distribution involves use of heat compensation profiles with corresponding heat distribution. The heat compensation profile comprises a set of compensation coefficients that represent the deviation of the object having a heat distribution according to the heat compensation profile and the cooled down object. When the compensation coefficients are applied to the measured object the resulting measures correspond with the measurement results of the object after the object has been cooled.

9 Claims, 4 Drawing Sheets

(51) Int. Cl.
G01B 5/00 (2006.01)
G01N 21/01 (2006.01)

(58) Field of Classification Search
USPC .......................... 356/237.2–237.6, 429, 430
See application file for complete search history.

(56) References Cited

U.S. PATENT DOCUMENTS

| | | | | |
|---|---|---|---|---|
| 7,460,216 | B2* | 12/2008 | Lecomte | G01B 11/162 |
| | | | | 356/604 |
| 7,553,070 | B2* | 6/2009 | Kollgaard | G01N 25/72 |
| | | | | 250/341.1 |
| 8,311,777 | B2* | 11/2012 | Sugiura | G01B 11/2522 |
| | | | | 356/600 |
| 2003/0038179 | A1* | 2/2003 | Tsikos | G02B 27/095 |
| | | | | 235/454 |
| 2010/0100275 | A1 | 4/2010 | Mian et al. | |
| 2010/0118137 | A1 | 5/2010 | Avila et al. | |
| 2013/0077650 | A1 | 3/2013 | Traxler et al. | |
| 2013/0107004 | A1 | 5/2013 | Maeda et al. | |
| 2014/0157861 | A1* | 6/2014 | Jonas | G01B 5/008 |
| | | | | 73/1.79 |
| 2015/0083920 | A1* | 3/2015 | Shepard | G01J 5/0896 |
| | | | | 362/233 |
| 2016/0146589 | A1* | 5/2016 | Jonas | G01B 5/0014 |
| | | | | 33/503 |
| 2018/0031491 | A1* | 2/2018 | Thompson | G01N 21/94 |
| 2019/0180151 | A1* | 6/2019 | Fryshman | A01M 1/026 |

FOREIGN PATENT DOCUMENTS

| | | |
|---|---|---|
| CN | 103376058 A | 10/2013 |
| CN | 103827623 A | 5/2014 |
| CN | 105358935 A | 2/2016 |
| DE | 10 2013 204 581 A1 | 9/2014 |
| EP | 0 080 353 A2 | 6/1983 |
| WO | WO 2013/021157 A1 | 2/2013 |
| WO | WO 2014/181134 A1 | 11/2014 |

OTHER PUBLICATIONS

International Search Report for corresponding International Patent Application No. PCT/EP2018/077068 dated Dec. 12, 2018, 4 pages.
Written Opinion of the International Searching Authority for corresponding International Patent Application No. PCT/EP2018/077068 dated Dec. 12, 2018, 7 pages.
Finnish Search Report for corresponding Finnish Patent Application No. 20175879 dated Jan. 25, 2018, 2 pages.

* cited by examiner

MEASUREMENT SYSTEM WITH HEAT MEASUREMENT

This application is a National Stage Application of PCT/EP2018/077068, filed 5 Oct. 2018, which claims benefit of Patent Application Serial No. 20175879, filed 6 Oct. 2017 in Finland and which applications are incorporated herein by reference. To the extent appropriate, a claim of priority is made to each of the above disclosed applications.

DESCRIPTION OF BACKGROUND

The following disclosure relates to measurement systems. Particularly, the application relates to measuring machine vision systems that are used in quality control or in other similar tasks that require measuring an object. Computer controlled measurement systems are used in various applications. One typical application is quality control of manufactured objects in manufacturing industry. It is possible to measure various properties of an object by imaging the manufactured object using one or more cameras. The measurement may involve measuring a whole object or some selected features of the object. Thus, the measurement may be one-, two- or three-dimensional or may even be performed in a combination of dimensions depending on the selected features. In addition to the size and shape, it is also possible to measure other characteristics, such as color, roughness or other such features. The measurements of a measurement system, such as a measuring machine vision system, are typically made by comparing the manufactured object with a model object. The results achieved typically give a relative difference of the measured object and the model object used.

To measure a three-dimensional coordinate, only two cameras are required as a three-dimensional coordinate can be computed from two two-dimensional images, provided that the measured point is visible in both images. However, typically the number of cameras is larger. This is because a larger number of cameras increases the coverage and accuracy of the measurement. The cameras are typically located so that they can see all features of the measured object, or at least as many of the features as possible. Correspondingly, it is common that a measured feature is not seen by all of the cameras. In addition to increasing the number of cameras, a plurality of other concepts, such as precise calibration and image processing algorithms, are known to improve the measurement accuracy. Furthermore, it is possible to plan the camera locations for particular objects or use more accurate cameras or specific lighting to improve the quality of images acquired from desired features.

Instead of, or in addition to, measuring camera systems it is possible to use other measuring instruments, such as probes and other mechanical measurement tools.

One source of inaccuracies is the measuring temperature. Manufactured and measured objects may still be warm or even hot when they come out from the manufacturing line, particularly when the manufactured object is measured immediately after manufacturing. For example, the object may be manufactured using a welding robot and it means that the welded points and also surroundings are probably warm or even hot. Furthermore, some of the objects pass through several working cells, such as several welding robots. In such case some of the welded points or seams that are earlier in the production path may have significantly cooled while the later welding points or seams are still hot.

However, manufactured objects are used after they have cooled into a normal temperature and they need to fulfill manufacturing tolerances in a given temperature, such as room temperature. Because of the heat expansion and heat expansion caused tensions and other deformations the manufactured items may not be able to meet these tolerances when they are still warm even if they fulfill them after cooling.

A conventional approach to reduce these inaccuracies is to use separate cooling stage between the manufacturing and measurement so that the measured object has been cooled into the desired temperature. There are several approaches to implement this. For example, there may be separate cooling conveyors or storage that use passive cooling. Instead of passive active cooling rooms with air conditioning or cooling with water spray or other coolant may also be considered.

A common drawback of these conventional approaches is that they require separate arrangements that are costly and require space. Furthermore, as it is commonly known cooling is slow process and it may take long time before the object is ready for the measurement. Using active cooling may be faster but it is typically expensive and using water spray or other coolants may not be suitable for all materials. Furthermore, it is possible that some materials are not suitable for any of the active cooling methods as too fast cooling may change the structure of the material.

SUMMARY

A measurement system using heat compensation profiles for compensating inaccuracies caused by heat expansion is disclosed. Measurement of objects with different heat distribution involves use of heat compensation profiles with corresponding heat distribution. The heat compensation profile comprises a set of compensation coefficients that represent the deviation of the object having a heat distribution according to the heat compensation profile and the cooled down object. When the compensation coefficients are applied to the measured object the resulting measures correspond with the measurement results of the object after the object has been cooled.

In the following description the expression heat compensation profile is meaning a profile comprising information regarding shape and thermal properties of a manufactured object. The heat compensation profile can include any information that is related to the temperature and heat distribution of a manufactured object. It is common that a plurality of objects are manufactured and the number of actual manufactured objects may be very high. Thus, one object type may be associated with a number of heat compensation profiles that all include at least partially different heat distribution or other heat related parameter values. Furthermore, the heat compensation profile comprises heat compensation coefficients, correction coefficients or other similar values from which the final form of a cooled down object can be predicted. The profile may comprise additional information, such as metadata or similar.

In an aspect a method for measuring an object using a computer controlled measurement arrangement is disclosed. The method comprises measuring at least one object, wherein the measuring comprises measuring dimensions and a heat distribution of the at least one object, comparing the measured heat distribution with a plurality of stored heat compensation profiles, determining at least one heat compensation profile representing the measured heat distribution, receiving at least one set of compensation coefficients associated with the determined at least one heat compensation profile and applying a set of received compensation coefficients to measured dimensions of the at least one object for producing heat compensation profile compensated dimensions.

In an example implementation of the method the method further comprises, when determining at least one heat compensation profile: comparing the determined at least one heat compensation profile to a threshold value; and when the deviation between at least one corresponding point in the measured heat distribution and the determined at least one heat compensation profile exceeds the threshold, generating a heat compensation profile corresponding with the measured heat distribution.

In an example implementation of the generating a heat compensation profile further comprises: storing the measured dimension and the heat distribution into the heat compensation profile; transmitting the measured at least one object for cooling; receiving the transmitted object back; measuring the received object; computing compensation coefficients; and associating the computed compensation coefficients into the heat compensation profile.

In an example implementation of the method the method further comprises computing compensation coefficients from determined at least two heat compensation profiles. In an example implementation of the method the method further comprises comparing the heat compensation profile compensated dimensions to a reference object. In an example implementation of the method the heat compensation profile comprises at least one measurement point.

In an aspect a computer program comprising computer program code configured to perform a method described above is disclosed.

In an aspect a controller is disclosed. The controller comprises at least one processor and at least one memory, wherein said at least one processor is configured to perform a method described above. In an aspect a measurement system comprising a controller as described above is disclosed. In an example implementation the measurement system further comprises a housing, a camera system comprising a plurality of cameras inside the housing, at least one heat measurement device, a lighting system comprising a plurality of lighting devices inside the housing and wherein the controller is connected to the machine vision system and configured to perform as described above.

The measurement system using heat compensation profiles as described above is beneficial when measuring object in different temperatures. A benefit of the measurement system using heat compensation profiles is that it is possible to measure objects immediately after the manufacturing. A benefit of the measurement system is that the costly cooling phase can be avoided. This increases the measurement efficiency as the objects can be measured faster. Furthermore, this reduces costs as there is no need for providing separate arrangements for cooling all of the measured objects. These arrangements may be expensive and require space as an arrangement suitable for cooling all objects is not typically easy to do. Furthermore, a benefit of the measurement system is that it is capable of measuring the objects in different temperatures. Thus, possible additional pauses and other events decreasing or increasing the temperature of the points of interest can be taken into account.

BRIEF DESCRIPTION OF THE DRAWINGS

The accompanying drawings, which are included to provide a further understanding of the measurement system and constitute a part of this specification, illustrate embodiments and together with the description help to explain the principles of the measurement system. In the drawings.

DETAILED DESCRIPTION

Reference will now be made in detail to the embodiments, examples of which are illustrated in the accompanying drawings.

In the following description heat compensation profile and heat distribution are discussed. With the expression heat distribution a measured heat distribution of a measured object is meant. For example, when an object to be measured arrives at a measurement station it may be measured using several different measurement tools including a heat camera or similar heat measurement device. Using the heat measurement device it is possible to measure the heat distribution of the object. If a probe-type heat measurement device is used a temperature at several points may be measured, however, in some applications it is sufficient to measure the temperature at one pre-determined point.

The heat distribution depends on the operations performed to the measured object and the waiting times between the manufacturing and measurement. Furthermore, a person skilled in the art understands that the heat distribution is not necessarily equally distributed. For example, if the object was welded using a welding robot before the measurement it is obvious that the welding location is warmer than the rest of the object before the object cools down. The temperature at the warm point is not always the same but varies depending on the welding operation and cooling times before the measurement. In some applications also the ambient temperature may have significant impact to the cooling.

When the heat distribution is measured a heat compensation profile can be created based on the measured distribution. The heat compensation profile comprises measurement results indicating the heat distribution and a set of compensation coefficients. The measured heat distribution and the corresponding heat compensation profile do not need to cover the whole object but only those parts that are to be measured.

In the following description a machine vision system involving a plurality of cameras is discussed. However, the expression camera is used only for providing an understanding, as a conventional digital camera is typically suitable for the purpose. Instead of a conventional camera, also other types of viewing sensors that are able to produce an image that is suitable for comparison may be used. These include different types of special purpose cameras, for example a heat camera, scanner devices, digital x-ray imaging apparatuses, bendable imaging units, three-dimensional cameras and the like. In the following description heat cameras are used for measuring a heat compensation profile and ordinary digital cameras are used for imaging the object to be measured. Also other suitable combinations may be used. Furthermore, even if in the following example only machine vision approach is discussed the principles can be applied to mechanical measurement devices.

Figure 1:
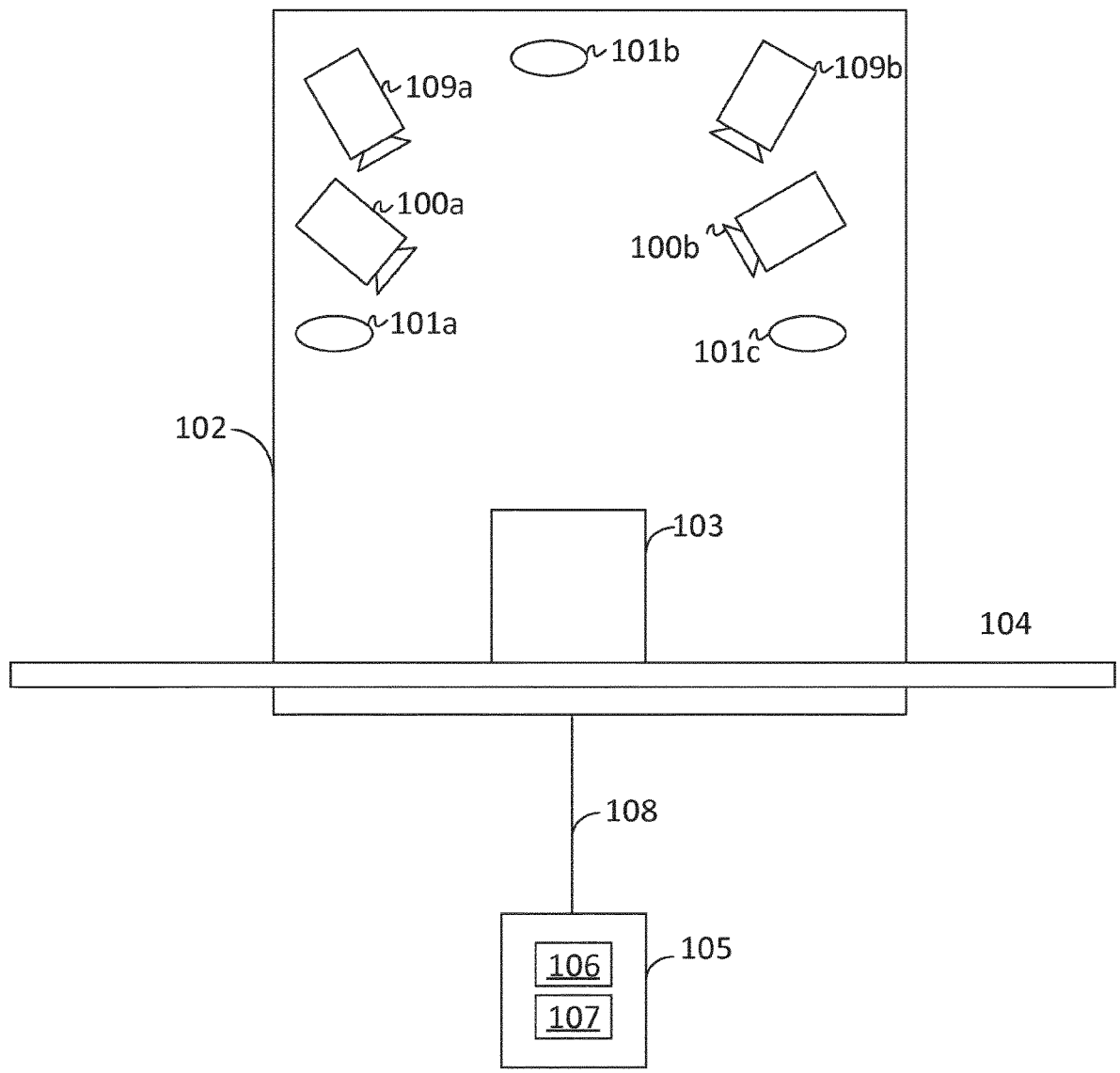
FIG. 1 is an example of a measurement system.

In FIG. 1, a block diagram illustrating an example of a machine vision system is disclosed. In FIG. 1 a measurement station 102 is disclosed. The measurement station 102 includes two cameras 100a and 100b and three lighting devices 101a-101c. The example of FIG. 1 further includes two heat cameras 109a and 109b. The number of cameras, heat cameras and lighting devices is not limited to two and three but can be chosen freely. Typically, the number of cameras, heat cameras and lighting devices is higher. Cameras, heat cameras and lighting devices may be attached to one or more frames that are further attached to the measurement station 102. Instead of frames, the cameras and lighting devices may also be directly attached to the walls of the measurement station 102. The cameras and if needed, also the lighting devices, are calibrated using conventional calibration methods to a selected coordinate system.

The measurement station 102 further includes a conveyor 104 that is used to bring an object 103 to be measured inside the measurement station. The conveyor is just an example; the measured object may also be brought by using other means, such as an industrial robot, or it can be placed by a person performing measurements.

In this description the ambient light is assumed to be the lighting conditions of the hall or premises where the measurement station is located. Ambient light may be natural light from windows or lighting devices in the premises. It is beneficial that the measurement station 102 can be closed such that ambient light does not disturb the measurements, however, this is not always necessary. For example, if the measurement benefits from the exactly defined lighting arrangement the ambient light may be compensated. Using a powerful lighting arrangement it is possible to use the measurement station 102 even if some leaking ambient light may cause some variation in the measurement conditions. The closure of the measurement station 102 can be provided, for example, by using doors or curtains at conveyor openings if a conveyor is used. If the measured object is placed to a measurement platform by a person it is easy to manufacture tight measurement station where the ambient light is completely removed. If the ambient light cannot be completely remove additional lighting devices that are used for compensating the ambient light may be used.

The measurement station 102 is connected to a controller 105 by using a network connection 108. The network connection may be wired or wireless. The controller may be arranged at the measurement station or it can be in a remote location. If the controller 105 is located at the measurement station 102 it can be operated remotely, for example, from a control room for controlling several systems of the manufacturing site. The controller 105 comprises at least one processor 106 and at least one memory 107. The processor is configured to execute computer program code in order to perform measurements. The at least one memory 107 is configured to store computer program code and the related data, for example, the acquired measurement images and reference views. The controller 105 is typically connected to further computing devices, for example, for possible long term storage of the measurement images and measurement conditions.

Figure 2:
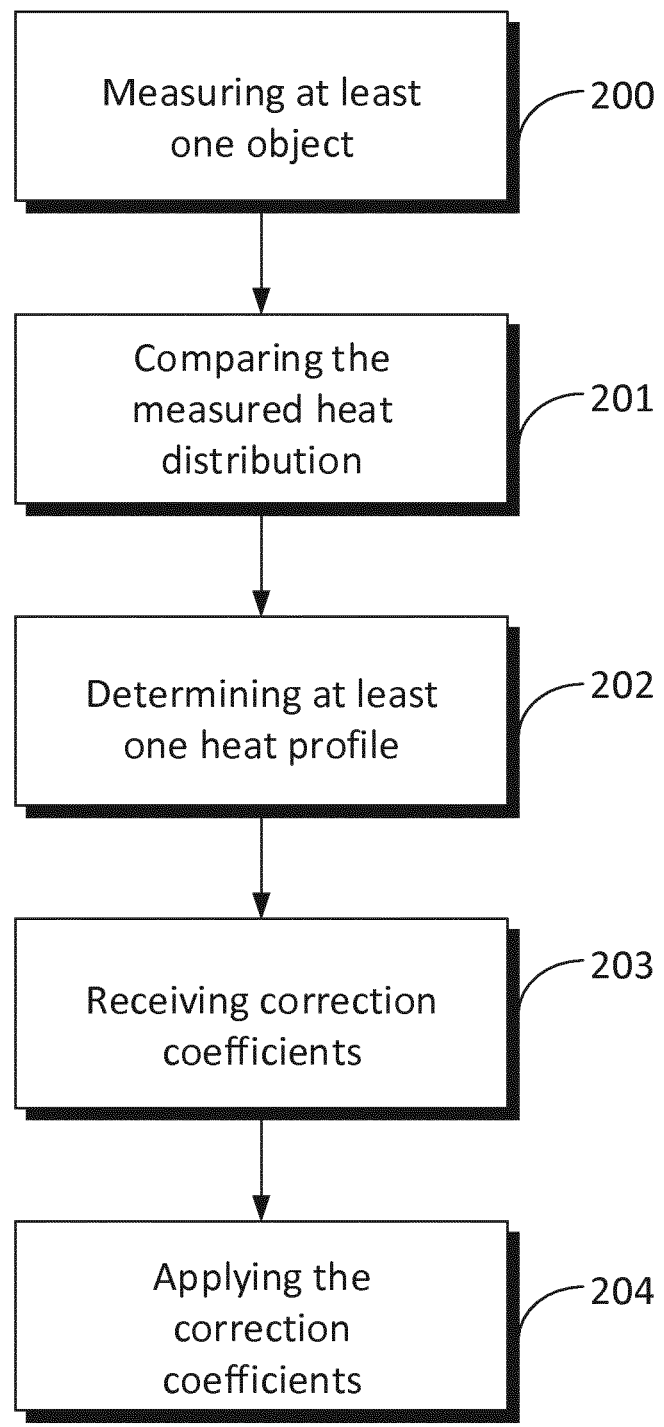
FIG. 2 is an example of a method of a measurement system.

FIG. 2 discloses an example method of a machine vision system. In the method a machine vision based measurement station, such as the measurement station of FIG. 1, may be used.

The method starts by receiving an object to be measured. The measured objects are received, for example, by using a conveyor and measured using a machine vision system, step 200. Any conventional machine vision based measurement arrangement may be used for measuring the dimensions of received objects. The measurement is then supplemented by measuring the heat distribution of the received object. This may be done, for example, by using heat camera or any other similar infrared light based measurement device. In some applications even a measurement probe for measuring a point on the object may be used, however, contactless arrangements are generally preferred.

The measured heat distribution is then compared with predetermined heat compensation profiles, step 201. The number of predetermined heat compensation profiles may be high, however, it is determined by application basis and can be changed over a time if it is seen that a larger number of heat compensation profiles would be beneficial. Heat compensation profiles, as explained above, include a heat distribution measurement and a set of compensation coefficients. The comparison is done based on the stored heat distribution.

As a result of comparison at least one heat compensation profile is chosen, step 202. The chosen heat compensation profiles are determined to be representing the measured heat distribution, however, it is common that the measured heat compensation profile does not exactly match the measured heat distribution. Heat compensation profiles are chosen so that they correspond with the measured heat distribution as well as possible. Thus, it is possible that more than one heat compensation profile is chosen for one object. These chosen heat compensation profiles may represent the whole object or chosen parts of the object. When a heat compensation profile matches closely or exactly the measured heat distribution only one heat compensation profile may be used for achieving good results. The accuracy requirement of the representation depends on the measured object, materials, general temperatures, required accuracy of the final measurement and similar. For example, it is possible to choose accuracy such that there is no essential change caused by thermal expansion. For example, heat compensation profiles representing a certain point may have accuracy of five degrees of centigrade. In practice this could mean, for example, that in the set of heat compensation profiles there is a heat compensation profile at least every five degrees of centigrade and the change between two subsequent heat compensation profiles is so small that it is not relevant with regard the end result.

In the example of FIG. 2 it is assumed that only one heat compensation profile is chosen. The possibility of using more than one heat compensation profile is explained later. After choosing the heat compensation profile corresponding compensation coefficients are received, step 203. The coefficients represent the difference between the object according to the measured heat distribution and the same object after it has cooled to the normal temperature, which may be, for example an intended final measurement temperature, using temperature or any other reference temperature.

The received compensation coefficients are then applied to the measured dimensions, step 204. Typically this means that the measured dimension are adjusted to a smaller value because of the thermal expansion. However, the method is applicable also to objects that are cooled below the reference temperature. Thus, applying the compensation coefficients may adjust the dimension to a larger value if the measured object gets warmer after manufacturing and thus bigger because of the thermal expansion. After applying the compensations coefficients the adjusted measurement results correspond with the results that are achieved when the same object is measured in the reference temperature. The adjusted dimensions can then be used in determining if the measured object fulfills the quality requirements. This determination can be done using the known methods as if the measurement was done on an object in the reference temperature. This determination may be used as a final result of the measurement meaning that there will be no further measurement and the object is accepted. In another embodiment the result is just for preliminary screening so that object that clearly do not match the quality requirements are removed at the earlies possible stage of the manufacturing process.

Figure 3:
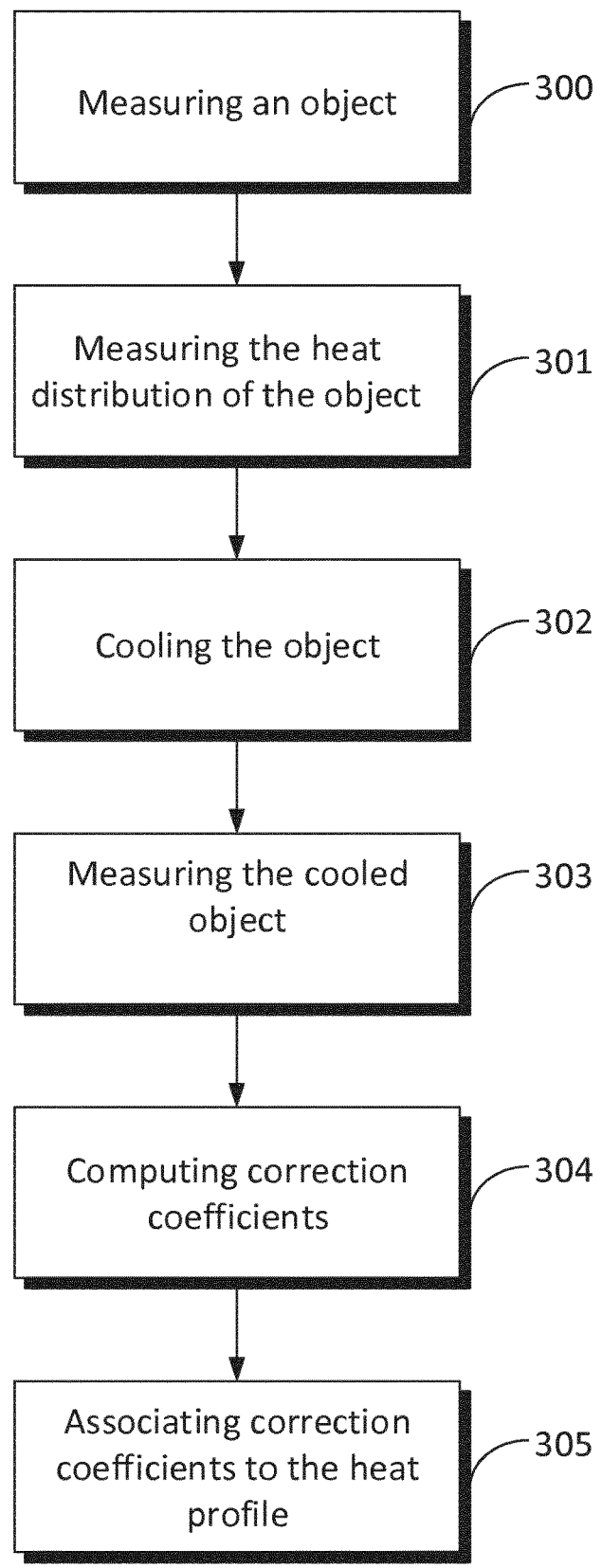
FIG. 3 is an example of a method for generating heat compensation profile.

In FIG. 3 an example of a method for determining compensation coefficients is disclosed. The method of FIG. 3 is initiated by a measurement person, however, it is possible to include partially or completely automatic systems that produce heat compensation profiles when suitable heat compensation profile cannot be found. This will be explained in more detail after the basic principles.

The method of FIG. 3 is initiated by measuring the dimensions of an object, step 300. The measurement system is any conventional machine vision measurement system. Furthermore, in the method also the heat distribution is measured, step 301. Steps 300 and 301 do not need to be in this particular order and may be performed in parallel. For example, dimensions are measured using ordinary digital cameras and the heat distribution is measured using heat cameras at the same time.

After the object has been measured it will be cooled into normal temperature, step 302. In this application the normal temperature means the temperature in which the final quality control is performed. This may be, for example, room temperature or any other temperature chosen on application basis.

The object is measured again in the normal temperature, step 303. As explained above in typical application the object is slightly smaller because of the heat distortion. However, it is possible that the object is warmed into the normal temperature and is slightly larger.

After the necessary measurements have been performed the compensation coefficients can be computed, step 304. The compensation coefficients represent the difference between the warm and cool object. At its simplest the compensation coefficients are computed, for example, by dividing the measurement results of the cooled object by the measurement results of the warm object. This will result a set of compensation coefficients. When warm objects are measured the corresponding cooled object results may be provided computationally by multiplying the warm object results by compensation coefficients. The measurement results may include several measurement points and each of the measurement points typically has a compensation coefficient. If the compensation coefficient is missing the measurement point may be ignored or a compensation coefficient may be computed, for example, by using interpolation or other computational methods.

Finally, the computed compensation coefficients are associated with the measured heat distribution, step 305. The combination of the heat distribution and associated compensation coefficients forms the heat compensation profile that may be used when measuring warm objects as described above with referral to FIG. 2.

In method 3 an example of generating one heat compensation profile was explained. The heat compensation profiles may be generated manually or automatically. For example, when a new object to be measured arrives at the measurement station it is possible to determine if there is a suitable heat compensation profile. If the deviation to the existing heat compensation profiles exceeds the limit set by the measurement station operator the received warm object is measured as in steps 300 and 301. Then, the measurement station informs the operator that the measured object needs to be removed from the measurement station. The removed object is measured later again and the measurement results may be used for computing the compensation coefficients. In another implementation the measurement station comprises automatic means for removing the measured object for a predetermined period and after which it is returned back to the measurement station for the second measurement.

The number of heat compensation profiles depends on the application. If a high number of heat compensation profiles is needed then the fully automatic approach may be preferred. After a learning phase the automatic approach has produced the needed high number of heat compensation profiles and new profiles are generated only exceptionally.

The number of heat compensation profiles may be managed automatically. For example, it possible to determine one or more points, for example, in form of a grid that are measured from every object. Then, a threshold value for each point is determined. The threshold value may be expressed in an absolute scale, for example a difference in centigrades or in a relative scale, for example, in percentages or an intensity of a measured point in the heat camera image. It is not necessary to detect exact temperatures. It is sufficient to detect if there is a significant change that has an effect with regard thermal expansion. It may be chosen that a new heat compensation profile is created always when threshold value of any of determined points is exceeded. The exceeding of the threshold value may be detected automatically. When this occurs the measurement results are stored and a robot may pick the object for cooling or the object may be guided to a cooling track by using other means. After the object has been cooled the robot will return the object to the measurement stage and the cooled object is measured. Then, the compensation coefficients may be computed as described above. Thus, the process generating new heat compensation profiles may be fully automatic.

In the above cooling arrangements have been disclosed. It should be understood that the cooling arrangements required by the heat compensation profile generation may be manual or automatic. As the cooling arrangements do not need to cool down each of the measured objects the cooling arrangements may be considerably smaller than in conventional solutions. Furthermore, in some embodiments and use cases cooling arrangements are not even needed after producing a sufficient number of heat compensation profiles. Thus, if an automatic cooling arrangement is used it may be removed after the sufficient number of heat compensation profiles is reached. In such case it is estimated that it is not likely that new heat compensation profiles are needed, however, it is possible to provide an alarm to the arrangement so that staff is alarmed if a need for further heat compensation profile occurs. In such case it is convenient to generate additional heat compensation profiles manually.

Even if in the above description cooling is discussed only in relation to building new heat compensation profiles it may be necessary to cool some objects before the measurement. For example, when measuring a welded object the welded point may still be so hot that it generates smoke that may interfere the measurement. Thus, the object may need to be cooled so that it does not smoke. The temperature as such is not a problem for the measurements. For example, molded objects may be considerably hotter and can be measured without problems.

Figure 4:
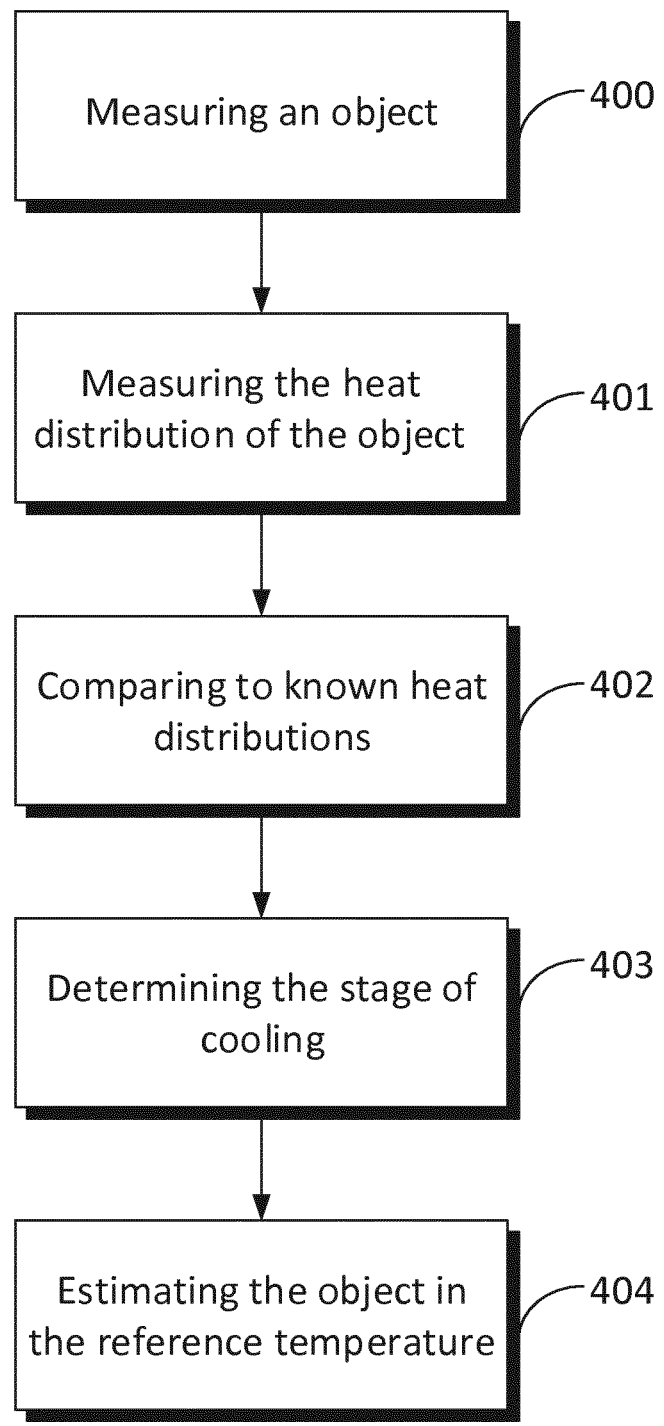
FIG. 4 is an example of a method with heat compensation.

In FIG. 4 another example of a method with heat compensation is discussed. The method is again initiated by measuring an object, step 400. Then the heat distribution of the object is measured, step 401. The measured heat distribution is then compared against known heat distributions, step 402. Based on the on the comparison it is possible to determine at which phase the cooling process is, step 403. This can be done as the measured object behave in corresponding manner when cooling. Thus, based on the estimated stage of the cooling process it is possible to estimate the object shape in the reference temperature, step 404. This facilitates the quality controlling immediately after the object has been manufactured.

The above mentioned methods may be implemented as computer software comprising computer program code, which is executed in a computing device able to communicate with external devices. When the software is executed in a computing device it is configured to perform the above described inventive method. The software is embodied on a computer readable medium so that it can be provided to the computing device, such as the controller 105 of FIG. 1.

In the above a systematic approach for compensation the deformations caused by heat distortion is disclosed. Manufactured objects can be measured at any temperature as the size and shape of the object can be compensated to correspond the size and shape of the object that is in the reference temperature that is used in quality control measurements. The above explained principles can be applied to complete objects or portions of an object. For example, the object may have a feature that is of a particular interest and the rest of the object needs not to be measured.

In the above a detailed example explaining heat compensation using machine vision system is explained. However, the same principles may be applied to other measurement arrangements involving measuring warm or hot objects. Furthermore, different measurement arrangements may also be combined.

As stated above, the components of the exemplary embodiments can include a computer readable medium or memories for holding instructions programmed according to the teachings of the present inventions and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the measurement system may be implemented in various ways. The measurement system and its embodiments are thus not limited to the examples described above; instead they may vary within the scope of the claims.

The invention claimed is:

1. A method for measuring an object using a measurement arrangement, the method comprising:
    measuring at least one object having a heat distribution that is not equally distributed, wherein the measuring comprises measuring dimensions of the at least one object and measuring a heat distribution of the at least one object, the measuring the heat distribution comprises measuring the at least one object at several points to provide a measured heat distribution of the at least one object;
    comparing the measured heat distribution of the at least one object with a plurality of stored heat compensation profiles;
    determining at least one heat compensation profile representing the measured heat distribution of the at least one object from the plurality of stored heat compensation profiles;
    receiving at least one set of compensation coefficients associated with the determined at least one heat compensation profile representing the measured heat distribution of the at least one object;
    applying the received at least one set of compensation coefficients to the measured dimensions of the at least one object and producing heat compensation profile compensated dimensions for the at least one object.

2. The method according to claim 1, wherein the method further comprises, when determining the at least one heat compensation profile:
    comparing the determined at least one heat compensation profile to a threshold value; and
    when the deviation between at least one corresponding point in the measured heat distribution and the determined at least one heat compensation profile exceeds the threshold, generating a heat compensation profile corresponding with the measured heat distribution.

3. The method according to claim 2, wherein the generating a heat compensation profile further comprises:
    storing the measured dimension and the heat distribution into the heat compensation profile;
    transmitting the measured at least one object for cooling;
    receiving the transmitted object back;
    measuring the received object;
    computing compensation coefficients;
    associating the computed compensation coefficients into the heat compensation profile.

4. A method according to claim 1, wherein the method further comprises computing compensation coefficients from determined at least two heat compensation profiles.

5. A method according to claim 1, wherein the method further comprises comparing the heat compensation profile compensated dimensions to a reference object.

6. A computer program comprising computer program code configured to cause performing a method according to claim 1 when the computer program is executed in a computing device.

7. A controller comprising at least one processor and at least one memory, wherein said at least one processor is configured to cause performing a method according to claim 1.

8. A measurement system comprising the controller according to claim 7.

9. A measurement system according to claim 8 further comprising:
    a housing
    a camera system comprising a plurality of cameras inside the housing;
    a lighting system comprising a plurality of lighting devices inside the housing; and;
    at least one heat measurement device;
    wherein the controller is connected to a machine vision system and configured to perform a method comprising,
    measuring at least one object having a heat distribution that is not evenly distributed, wherein the measuring comprises measuring dimensions of the at least one object and measuring a heat distribution of the at least one object, the measuring the heat distribution comprises measuring the at least one object at several points to provide a measured heat distribution of the at least one object;

comparing the measured heat distribution of the at least one object with a plurality of stored heat compensation profiles;

determining at least one heat compensation profile representing the measured heat distribution of the at least one object from the plurality of stored heat compensation profiles;

receiving at least one set of compensation coefficients associated with the determined at least one heat compensation profile representing the measured heat distribution of the at least one object;

applying the received at least one set of compensation coefficients to the measured dimensions of the at least one object and producing heat compensation profile compensated dimensions for the at least one object.

* * * * *